United States Patent
Yurko et al.

(10) Patent No.: US 10,882,457 B2
(45) Date of Patent: Jan. 5, 2021

(54) LOCKING MECHANISM FOR IN-VEHICLE VACUUM ASSEMBLY

(71) Applicant: SHOP VAC CORPORATION, Williamsport, PA (US)

(72) Inventors: Michael Z. Yurko, Endicott, NY (US); Neil N. Norell, Candor, NY (US)

(73) Assignee: SHOP VAC CORPORATION, Williamsport, PA (US)

( * ) Notice: Subject to any disclaimer, the term of this patent is extended or adjusted under 35 U.S.C. 154(b) by 242 days.

(21) Appl. No.: 15/926,793

(22) Filed: Mar. 20, 2018

(65) Prior Publication Data

US 2018/0272954 A1 Sep. 27, 2018

Related U.S. Application Data

(60) Provisional application No. 62/474,300, filed on Mar. 21, 2017.

(51) Int. Cl.
*B60R 7/04* (2006.01)
*A47L 9/14* (2006.01)
(Continued)

(52) U.S. Cl.
CPC .............. *B60R 7/043* (2013.01); *A47L 5/24* (2013.01); *A47L 7/0076* (2013.01);
(Continued)

(58) Field of Classification Search
CPC ......... B60R 7/043; B60R 7/04; A47L 9/1427; A47L 7/0076; A47L 5/24; A47L 9/0027; A47L 9/0063; B60S 3/008; B60S 1/64
See application file for complete search history.

(56) References Cited

U.S. PATENT DOCUMENTS 5,189,753 A 3/1993 Sousa et al.
5,829,091 A 11/1998 Ingram et al.
(Continued)

FOREIGN PATENT DOCUMENTS

EP 0657587 A1 6/1995
EP 0674869 A1 10/1995
(Continued)

OTHER PUBLICATIONS

European Search Report and Opinion for European Application No. 18162948.6, dated Jul. 26, 2018.

*Primary Examiner* — David Redding
(74) *Attorney, Agent, or Firm* — Marshall, Gerstein & Borun LLP

(57) ABSTRACT

A vacuum cleaner configured to be mounted in a vehicle. The vacuum cleaner includes a vacuum module configured to draw a vacuum, and a collector module configured to collect debris, the collector module having an accessible portion and a liner. A duct operatively couples the vacuum module to the collector module. In addition, a release member is disposed on the top portion of the collector module and is moveable between a resting position and a release position. A locking bar is in contact with the release member and has a portion adapted to engage the liner of the collector module when the release member is in a resting position. Upon actuating the release member towards the release position, the release member moves the portion of the locking bar out of engagement with the liner and the collector module is disengaged from the vacuum module.

11 Claims, 16 Drawing Sheets

(51) Int. Cl.
- *A47L 7/00* (2006.01)
- *B60S 3/00* (2006.01)
- *B60S 1/64* (2006.01)
- *A47L 5/24* (2006.01)
- *A47L 9/00* (2006.01)

(52) U.S. Cl.
CPC .......... *A47L 9/0027* (2013.01); *A47L 9/1427* (2013.01); *B60S 3/008* (2013.01); *A47L 9/0063* (2013.01); *B60S 1/64* (2013.01)

(56) References Cited

U.S. PATENT DOCUMENTS

| | | | |
|---|---|---|---|
| 6,128,804 | A | 10/2000 | Lee et al. |
| 6,148,472 | A | 11/2000 | Arena |
| 6,490,751 | B2 | 12/2002 | Ganzenmuller |
| 6,553,610 | B1 | 4/2003 | Shideler |
| 6,813,805 | B2 | 11/2004 | Ganzenmuller |
| 7,152,272 | B2 | 12/2006 | Rukavina et al. |
| 7,266,859 | B2 | 9/2007 | Slone |
| 7,480,957 | B2 | 1/2009 | Ganzenmuller, V |
| 8,347,452 | B2 | 1/2013 | Maehata et al. |
| 8,615,845 | B2 | 12/2013 | Norell et al. |
| 9,499,134 | B2 | 11/2016 | Camiller |
| 9,751,504 | B2 | 9/2017 | Schultz et al. |
| 10,099,659 | B1 | 10/2018 | Williams et al. |
| 2003/0167590 | A1 | 9/2003 | Oh |
| 2003/0217432 | A1 | 11/2003 | Oh et al. |
| 2004/0107528 | A1 | 6/2004 | LeClear et al. |
| 2004/0134013 | A1 | 7/2004 | Slone |
| 2005/0011035 | A1 | 1/2005 | Rukavina et al. |
| 2005/0066468 | A1 | 3/2005 | Ganzenmuller |
| 2005/0273969 | A1 | 12/2005 | Watson et al. |
| 2006/0080801 | A1 | 4/2006 | Nameth |
| 2006/0085940 | A1 | 4/2006 | Chernoff |
| 2010/0005612 | A1 | 1/2010 | Moore |
| 2010/0083457 | A1 | 4/2010 | Norell et al. |
| 2010/0242206 | A1 | 9/2010 | Maehata et al. |
| 2012/0210536 | A1 | 8/2012 | Jan et al. |
| 2014/0130293 | A1 | 5/2014 | Lee et al. |
| 2015/0307066 | A1 | 10/2015 | Camiller |
| 2016/0068141 | A1 | 3/2016 | Schultz et al. |
| 2016/0368461 | A1 | 12/2016 | Logli, Jr. et al. |

FOREIGN PATENT DOCUMENTS

| | | |
|---|---|---|
| WO | WO-91/18773 A1 | 12/1991 |
| WO | WO-2006/088434 A1 | 8/2006 |
| WO | WO-2017/031030 A1 | 2/2017 |

LOCKING MECHANISM FOR IN-VEHICLE VACUUM ASSEMBLY

This Application claims the benefit of U.S. Provisional Application 62/474,300 filed on Mar. 21, 2017. The entire contents of these applications are incorporated herein by reference in their entirety.

FIELD OF THE INVENTION

The present invention relates generally to a vacuum cleaner configured to be mounted in a vehicle and, more particularly, to a locking mechanism for the same.

BACKGROUND

In order to clean a vehicle, such as a car or truck, a vacuum cleaner is often used to vacuum out dirt and debris. However, it can be awkward and/or inconvenient to use a typical in-home vacuum cleaner to clean out the interior of a vehicle. To address this inconvenience, attempts have been made to permanently install on-board vehicle vacuum cleaners inside the vehicle. However, the known on-board vehicle vacuum cleaners typically have a complex and dedicated installation arrangement, which limits the usage across different vehicles and/or in different arrangements within a vehicle.

In addition, removal of the vacuum assembly in a dedicated installation arrangement within the vehicle may be time consuming and difficult. For example, it is often difficult for users to access one or more devices or parts used to help remove the vacuum assembly from a desired location, such as to remove debris collected in the vacuum assembly, particularly without spilling the debris. In addition, while some parts may be relatively accessible, they can be heavy or cumbersome to handle, further adding to the difficulties in removing such vacuum assemblies from various positions within a vehicle.

SUMMARY OF THE DISCLOSURE

In accordance with a first exemplary aspect of the disclosure, a vacuum cleaner configured to be mounted in a vehicle comprises a vacuum module configured to draw a vacuum and a collector module configured to collect debris, the collector module having an accessible portion and a liner. An interconnecting duct operatively couples the vacuum module to the collector module, and a release member is disposed on the accessible portion of the collector module. The release member is moveable between a resting position and a release position. In addition, a locking bar is in contact with the release member and has a portion adapted to engage the liner of the collector module when the release member is in the resting position. Upon actuating the release member towards the release position, the release member moves the locking bar out of engagement with the liner and the collector module is disengaged from the vacuum module.

In accordance with another exemplary aspect of the disclosure, a vehicle with a vacuum cleaner comprises an area disposed between two seats of the vehicle, and a vacuum cleaner disposed in the area. The vacuum cleaner comprises a vacuum module configured to draw a vacuum, wherein the vacuum module includes a motor/impeller unit disposed within a motor housing. The vacuum cleaner further comprises a collector module configured to collect debris from air drawn by the vacuum module. The collector module includes a collector housing attached to the motor housing and a debris canister removably disposed in the collector housing, and the collector housing has an accessible portion and a liner. A release member is disposed on the accessible portion of the collector housing. The release member is moveable between a resting position and a release position. A locking bar is in contact with the release member and has a portion adapted to engage the liner of the collector module when the release member is in the resting position. Upon actuating the release member towards the release position, the release member moves the locking bar out of engagement with the liner, and the collector module is disengaged from the vacuum module and able to be lifted out of the area disposed between the two seats.

In accordance with another exemplary aspect, a vacuum cleaner configured to be mounted in a vehicle comprises a vacuum module configured to draw a vacuum and a collector module configured to collect debris. The collector module is operatively coupled to the vacuum module and has an accessible portion and a liner. The vacuum cleaner further includes a locking mechanism having a release member disposed on the accessible portion of the collector module and a locking bar in contact with the release member. The release member also has a portion adapted to engage the liner of the collector module when the release lever is in a resting position. Upon actuating the release member towards the release position, the release member moves the locking bar out of engagement with the liner and the collector module is disengaged from the vacuum module.

In further accordance with any one or more of the exemplary aspects, a vacuum cleaner or a vehicle with a vacuum cleaner optionally may include any one or more of the following preferred forms.

In some preferred forms, the release member includes a release lever comprising a base having a first end and a second end, a handle attached to the first end of the base, and a flange downwardly extending from the second end of the base. In addition, the locking bar includes an inwardly extending arm in contact with the downwardly extending flange of the release lever. Further, in some forms, upon actuating the release lever towards the release position, the flange of the release lever moves in a downward direction along the length of the arm of the locking bar and pivots to push a surface of the arm and move a portion of the locking bar out of the liner.

In other preferred forms, the vacuum cleaner may further include a biasing mechanism for biasing the release member, such as the release lever, in the resting position. The biasing mechanism may be disposed between the arm of the locking bar and a recessed surface of the accessible portion of the collection module. Also, the biasing mechanism may be in an expanded position when the release member is in the resting position and in a compressed position when the release lever is in the release position. Further, the interconnecting duct may have a substantially rigid body that forms a fluid flow duct extending from a first duct opening to a second duct opening. Still further, the rigid body may comprise a tube extending from the first duct opening at a first end of the tube to the second duct opening at a second end of the tube.

In other preferred forms, the release member comprises a release button having a body and a stem extending from the body. The stem has an angled surface, and the locking bar has an angled surface in contact with the angled surface of the stem. Upon actuating the release button, the stem moves to push the angled surface of the locking bar and move a portion of the locking bar out of the liner.

In yet other preferred forms, the interconnecting duct is configured to operatively couple the collector to the vacuum module in any one of a plurality of pre-defined arrangements, the plurality of pre-defined arrangements including at least one of an in-line configuration and a side-by-side configuration. In addition, the vacuum module includes a motor/impeller unit disposed within a motor housing. Further, the collector module includes a collector housing, and a debris canister is removably disposed in the collector housing, wherein the debris canister can be slidably removed from and reinserted into the collector housing. Also, a lid may be permanently attached to the collector housing via a hinge, and a latch disposed on a side of the collector housing. The latch may be moveable between a snapped position and an unsnapped position, such that when the latch is moved to the unsnapped position, the lid is moveable about the hinge to an open position.

In still other preferred forms, the collector housing may include a hose connector projecting outwardly from a rear portion of the collector housing and coupled to an air inlet, wherein the hose connector is configured to be coupled to a vacuum hose. In addition, the vacuum module and the collector module may be configured to fit into a space between two seats of the vehicle when operatively coupled together. Also, the vacuum module and collector module may be configured to fit within console housing.

In still other preferred forms, the area disposed between the two seats may include a console, and the vacuum cleaner may be disposed in the console. Thus, upon actuating the release member of the collector module towards the release position, the release member moves the locking bar out of engagement with the liner, and the collector module is disengaged from the vacuum module and lifted out of the console. In addition, the vacuum cleaner may be accessible through an opening of the console, and the debris canister may slide out of the collector housing and the opening of the console.

Additional optional aspects, arrangements, forms, and/or advantages of the vacuum cleaners disclosed herein will be apparent upon consideration of the following detailed description and the appended drawings, each different functionally operable and technically effective combination of which is expressly included as a part of the present disclosure.

BRIEF DESCRIPTION OF THE DRAWINGS

The Figures described below depict various aspects of the system and methods disclosed therein. It should be understood that each figure depicts an example of a particular aspect of the disclosed system and methods, and that each of the figures is intended to accord with a possible example thereof. Further, wherever possible, the following description refers to the reference numerals included in the following figures, in which features depicted in multiple figures are designated with consistent reference numerals.

There are shown in the drawings arrangements which are presently discussed, it being understood, however, that the present examples are not limited to the precise arrangements and instrumentalities shown, wherein.

DETAILED DESCRIPTION

A vacuum cleaner configured to be mounted in a vehicle is disclosed. The vacuum cleaner includes a vacuum module configured to draw a vacuum and a collector module configured to draw debris. An interconnecting duct operatively couples the vacuum module to the collector module. A locking mechanism is disposed on and within the collector module that enables the collector module to be both disengaged and lifted from the vacuum module and the console, when the vacuum cleaner is disposed within a console of a vehicle. More specifically, the locking mechanism includes a release member disposed on an accessible portion of the collector module and is moveable between a resting position and a release position. In addition, a locking bar is in contact with the release member and includes a portion adapted to be disposed within a liner of the collector module when the release member is in the resting position. Upon actuating the release member towards the release position, the release member moves the locking bar out of engagement with the liner to disengage and lift the collector module from the vacuum module.

Figure 17:
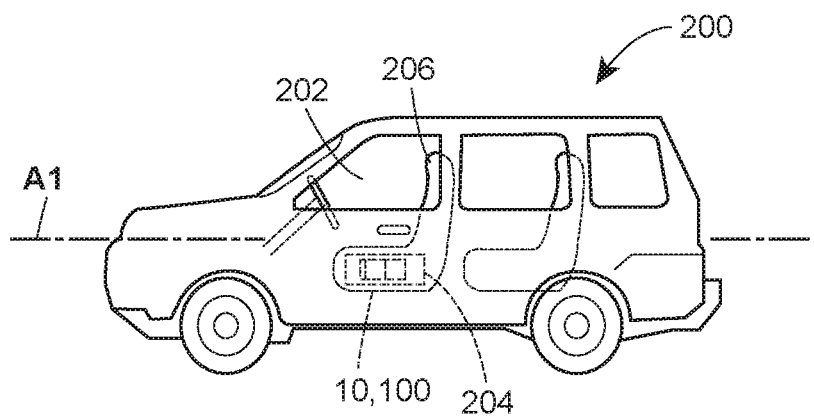
FIG. 17 is an exemplary illustration of a vacuum cleaner of FIGS. 1 and 13 operatively installed in a vehicle.
Figure 18:
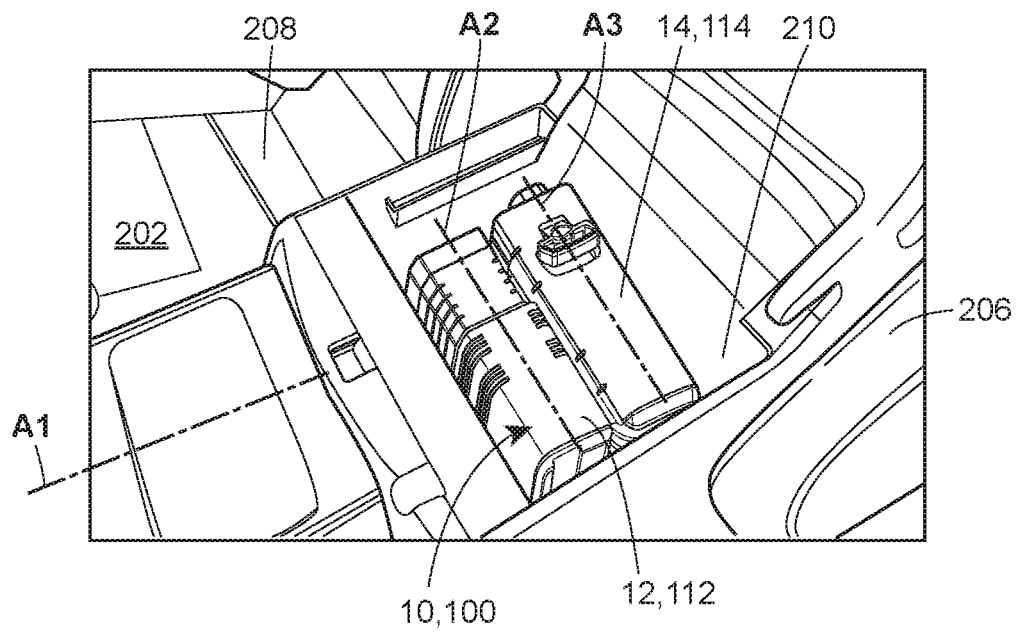
FIG. 18 is an enlarged isometric view of a center console of the vehicle of FIG. 17 with the vacuum cleaner of FIGS. 1 and 12 installed and exposed in the center console.

Referring now to FIGS. 1-5, a vacuum cleaner 10 having a locking mechanism 50 according the present disclosure is depicted. The vacuum cleaner 10 is configured to be installed and operated within a vehicle, such as a car or truck or other type of vehicle, as depicted in FIGS. 17 and 18, explained more below. Preferably, the vacuum cleaner 10 is configured to be installed within a passenger compartment of the vehicle to provide easy access and use of the vacuum cleaner for cleaning the interior of the passenger compartment.

The vacuum cleaner 10 has a modular configuration, including a vacuum module 12 and a collector module 14 that can be connected to each other as an integrated unit in any of a plurality of different pre-defined assembly arrangements with an interconnecting duct 16. The interconnecting duct 16 may not be flexible, but rather can have a fixed pre-defined shape that allows the collector module 14 to be operatively connected to the vacuum module 12 in only a limited number of predefined assembly arrangements. For example, FIGS. 1-8 depict the vacuum cleaner 10 with the collector module 14 operatively connected to the vacuum module 12 in a side-by-side configuration, and FIGS. 12-16 depict another vacuum cleaner 100 in an in-line configuration, as explained in more detail below. Further, all FIGS. 1-8 and 12-16 depict the vacuum cleaner in an upright installation orientation.

Because of its modular configuration, the vacuum cleaner 10 can be easily assembled and/or oriented in many different shapes and orientations. As a result, one can easily configure the vacuum cleaner 10 to fit different shapes and/or configurations of receptacle spaces within a vehicle, while maintaining the vacuum cleaner 10 as an integrated unit. For example, the vacuum cleaner 10 may be configured and oriented to fit in a space between seats, such as within a center console. Alternatively, the vacuum cleaner 10 may be configured and oriented to fit on the side or underneath a seat, in a space along the side wall of a cargo bay or passenger compartment of a sport utility vehicle (SUV) or in the trunk. However, because the interconnecting duct 16 can have a substantially rigid shape and couples the collector module 14 to the vacuum module 12 in pre-defined orientations as an integral unit, the vacuum cleaner 10 can be easily installed and/or removed and/or otherwise moved around as a single unit, which may provide easier handling of the vacuum cleaner 10 as compared to a vacuum cleaner that is not connected together as an integrated unit.

Figure 2A:
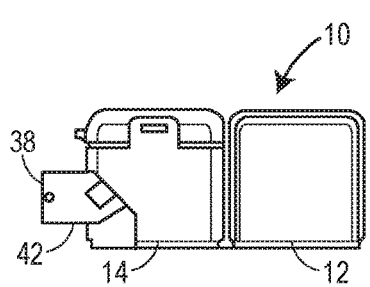
FIG. 2A is side view of the vacuum cleaner of FIG. 1.
Figure 2B:
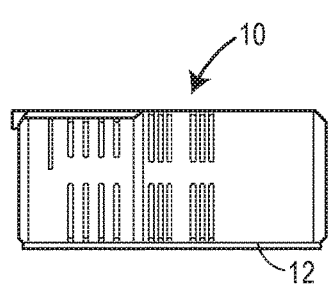
FIG. 2B is a front view of the vacuum cleaner of FIG. 1.
Figure 2C:
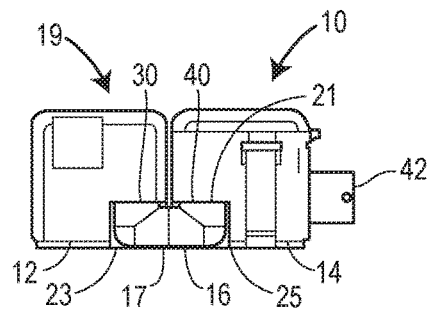
FIG. 2C is another side view of the vacuum cleaner of FIG. 1.
Figure 3:
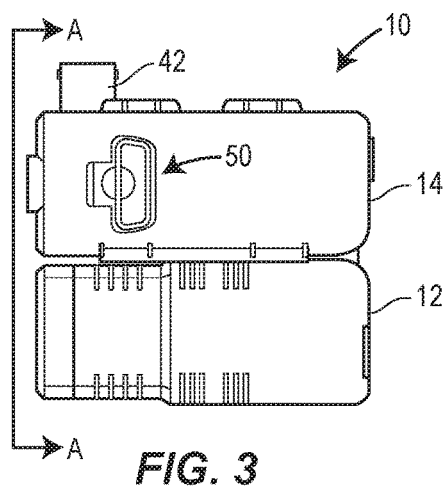
FIG. 3 is a top view of the vacuum cleaner of FIG. 1.
Figure 4:
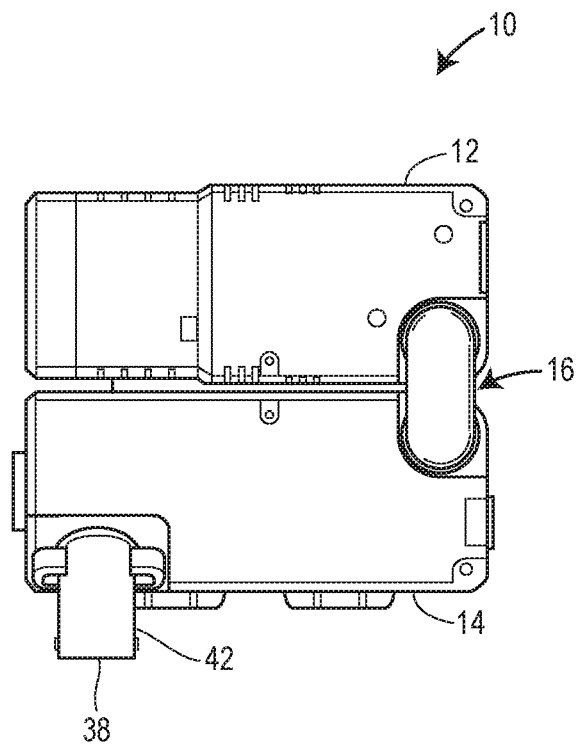
FIG. 4 is a bottom view of the vacuum cleaner of FIG. 1.

As depicted in FIG. 2C, the interconnecting duct 16 of the vacuum cleaner 10 is configured to operatively couple the collector module 14 to the vacuum module 12 in the side-by-side configuration. In this example, the interconnecting duct 16 has a substantially rigid body that forms a fluid flow duct 17 extending from a first duct opening 19, such as a vacuum intake portion, to a second duct opening 21, such as a clean air exhaust port. Alternatively, and as one of ordinary skill in the art will appreciate, the interconnecting duct 16 may be flexible in form. In addition, the body of the interconnecting duct 16 is a U-shaped tube extending from the first duct opening 19 at a first end 23 of the tube to the second duct opening 21 at a second end 25 of the tube.

As further depicted, the first duct opening 19 and the second duct opening 21 have shapes that correspond to the shapes of the first and second ends 23, 25 of the interconnecting duct 16. More specifically, each of the first and second duct openings 19, 21 forms a circular opening through its respective housing. As one of ordinary skill in the art will appreciate, the shape of the interconnecting duct 16 may take the form of various other shapes and still fall within the scope of the present disclosure. Likewise, the shape of the first and second duct openings 19, 21 may also have various different shapes that correspond to the shape of the interconnecting duct 16. When operatively installed, the first end 23 of the interconnecting duct 16 connects to the first duct opening 19, and the second end 25 of the interconnecting duct 16 connects to the second duct opening 21. In this way, air can be drawn from the interior of the collector module 14 into the interior of the vacuum module 12, for example, by a motor of the vacuum module 12, as explained more below.

Figure 6:
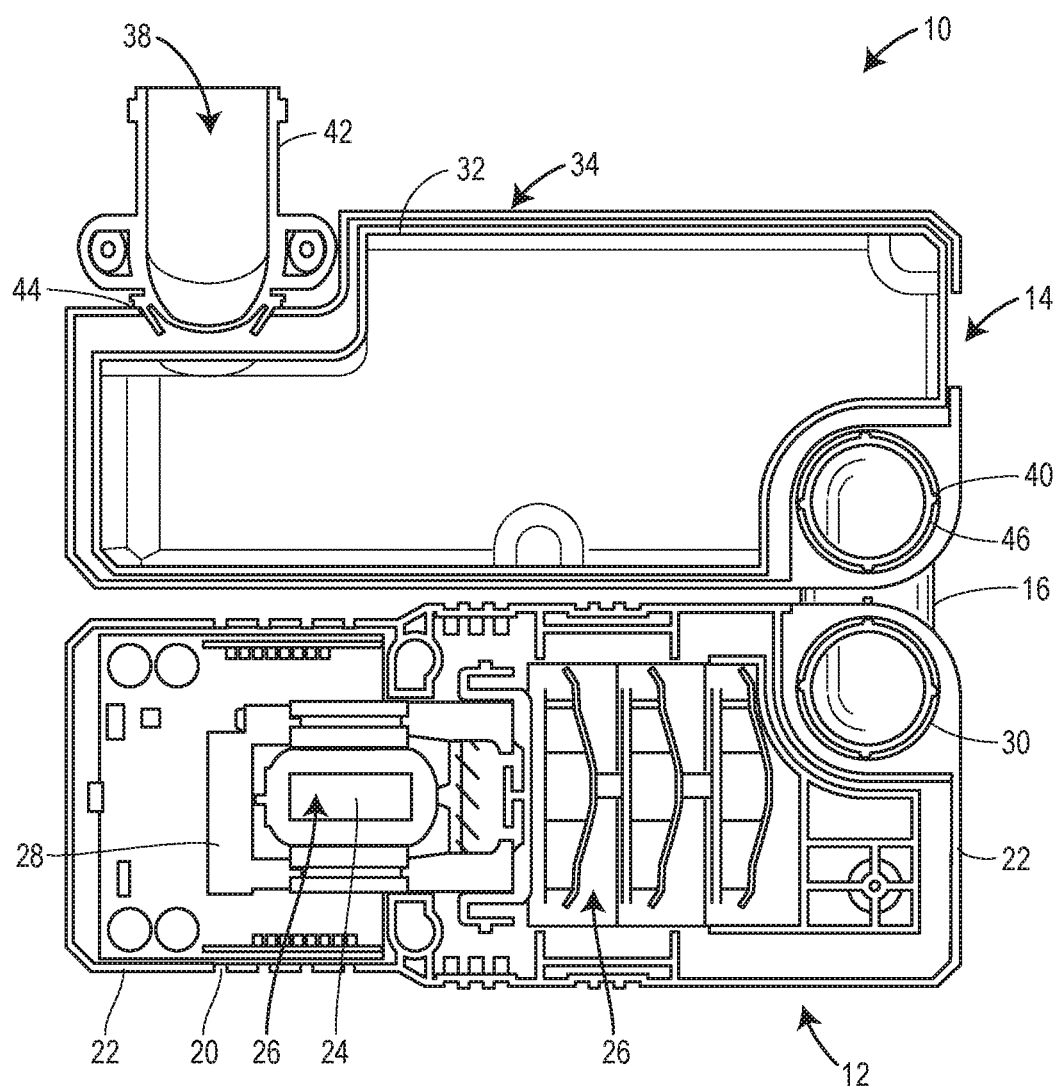
FIG. 6 is a top sectional view of the vacuum cleaner of FIG. 3 taken along lines A-A of FIG. 3.

Referring now to FIG. 6, the vacuum module 12 includes a motor/impeller unit 20 within a motor housing 22. The motor housing 22 has an outer shell with a generally elongate rectangular form. The motor housing 22 may take many different forms and shapes and sizes depending upon the particular space needs and/or arrangements desired for installation in a particular vehicle and still fall within the scope of the present disclosure. The motor/impeller unit 20 includes a motor 24 that drives an impeller assembly 26, and a controller 28 that controls the motor 24. The motor 24 can be of any design suitable for vacuum cleaners, including standard motors with brushes or brushless motors, and switched reluctance motors. The impeller assembly 26 may take any form suitable for moving air in a manner that will create a vacuum. In this arrangement, the impeller assembly 26 includes three in-line impellers. However, other forms of the impeller assembly 26 may also be used. The motor 24 is operatively coupled to the impeller assembly 26 to drive the impellers to create a vacuum. The controller 64 includes suitable electronics, such as a PCB board and/or other appropriate electronic control circuits configured to control the motor 24. As most easily seen in FIGS. 2C and 6, the motor housing 22 includes an intake opening 30 that forms a duct receiver and an air inlet for air that is drawn into the impeller assembly 26.

Still referring to FIG. 6, the collector module 14 includes a debris canister 32 disposed within a collector housing 34. The collector module 14 includes a lid 36 (see, e.g., FIGS. 7 and 8) that can be selectively opened to provide access to the debris canister 32. The debris canister 32 is removably received within the collector housing 34 such that the debris canister 32 can be slidably removed from and returned into the collector housing 34. The collector housing 34 also includes an air inlet 38 at one end of the housing and an air exhaust opening 40 in the opposite end of the collector housing 34. A hose connector 42 extends outwardly from the air inlet 38 for coupling with a vacuum hose. The air exhaust opening 40 also includes a duct receiver and an air outlet. The debris canister 32 includes an air intake opening 44 and an air outlet opening 46. The air intake opening 44 and the air outlet opening 46 of the debris canister 32 align with the air inlet 38 and the air exhaust opening 40 of the collector housing 34, respectively, when the debris canister 32 is operatively disposed within the collector housing 34, as depicted in FIG. 6.

Figure 1:
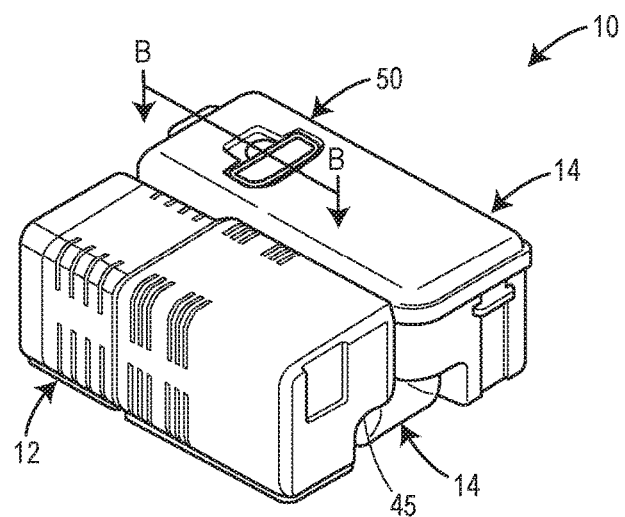
FIG. 1 is an isometric view of a vacuum cleaner to be mounted inside a vehicle having a locking mechanism according to the present disclosure, the vacuum cleaner in a first assembly arrangement and installation orientation.
Figure 7:
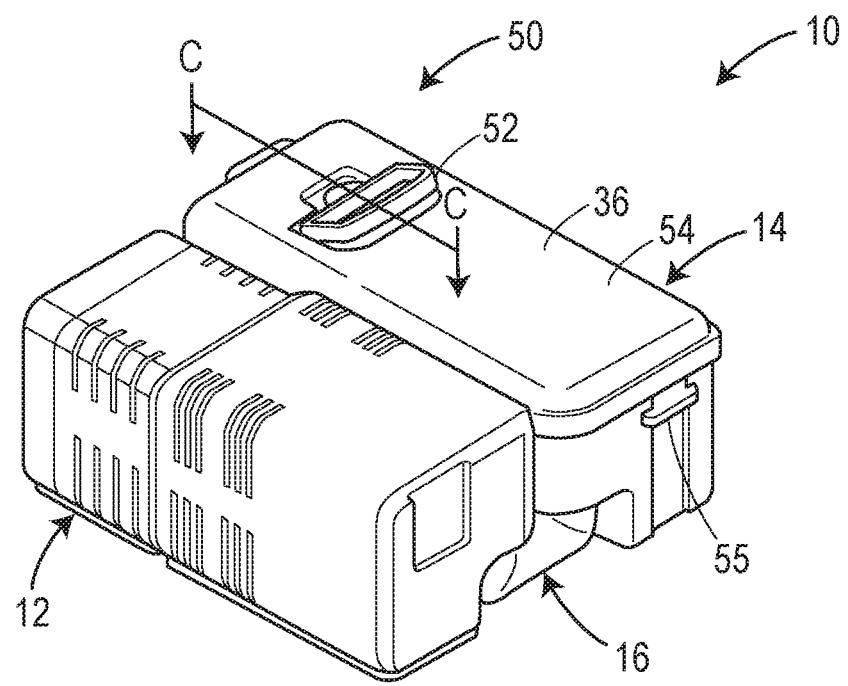
FIG. 7 is a isometric view of the vacuum cleaner of FIG. 1 with a release lever moved in an upward direction.
Figure 8:
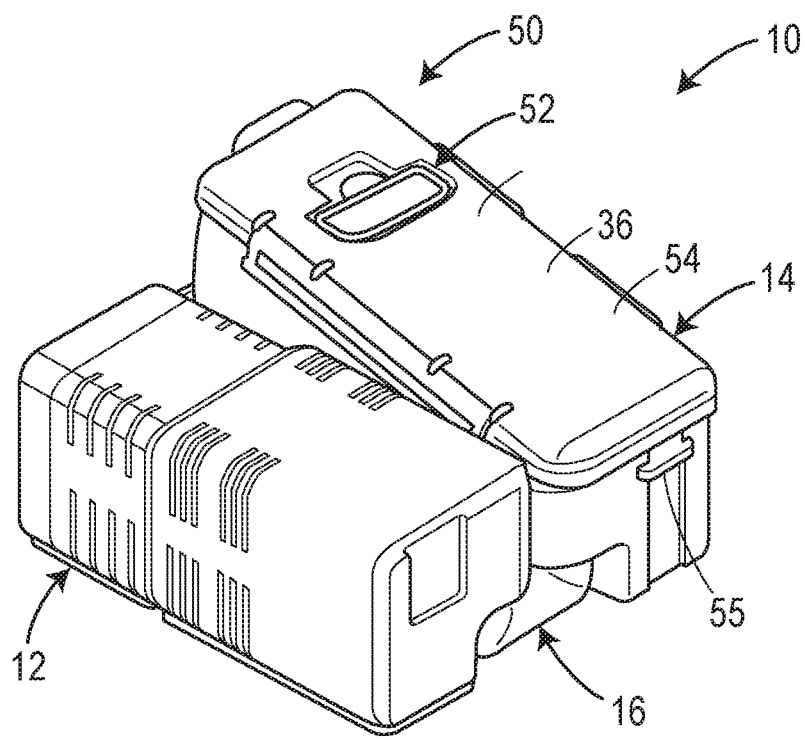
FIG. 8 is another isometric view of the vacuum cleaner of FIG. 1 with a collector module of the vacuum cleaner disengaged and partially lifted from a vacuum module of the vacuum cleaner.

Referring now to FIGS. 7 and 8, the locking mechanism 50 of the vacuum cleaner 10 is further depicted. More specifically, and in one example, the locking mechanism 50 includes a release member comprising a release lever 52 disposed on an accessible portion 54, such as a top portion 54 or the lid 36, of the collector module 14. The release lever 52 is moveable between a resting position, as depicted in FIG. 1, and a release position, as depicted in FIG. 7, and is accessible from the accessible portion 54 of the collector module 14. In this example, the release lever 52 is disposed left of center C of the top portion 54. However, the release lever 52 may alternatively be disposed closer to the center C or at the center C of the top portion 54 and still fall within the scope of the present disclosure.

FIG. 8 depicts the collector module 14 in a position disengaged from the vacuum module 12 and partially lifted from the vacuum module 12. In response to moving the release lever 52 from the resting position of FIG. 1 towards the release position of FIG. 7, the collector module 14 becomes disengaged from the vacuum module 12. Upon further movement of the release lever 52 in a first direction, such as an upward direction or further towards the release position, the collector module 14 is also lifted in the first direction, such as the upward direction. Said another way, upon moving the release lever 52 in the first direction, e.g., the upward direction, towards the release position, the collector module 14 not only begins to disengage from the vacuum module 12, but the collector module 14 also begins to lift away from the vacuum module 12, as depicted in FIG. 8. Upon further upward movement, the collector module 14 is able to be completely lifted from the vacuum module 12 and moved to a different location to remove debris collected therein, for example.

An open mouth hook 55 may be disposed on a side of the collector module 14 opposite the release lever 52. The open mouth hook 55 is engaged when the release lever 52 is in the resting position and disengages when the release lever 52 is moved to the release position and the collector module 14 is lifted away from the vacuum module 12, as depicted in FIG. 8, for example. Said another way, the open mouth hook 55 moves from an engaged position to a disengaged position when the collector module 14 is pivoted and moved from the vacuum module 12.

Figure 9A:
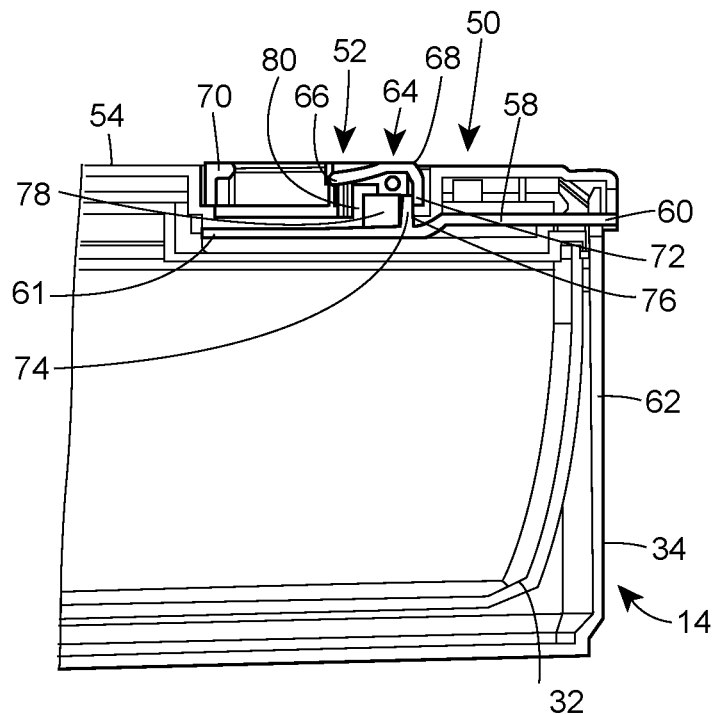
FIG. 9A is a sectional view of a portion of the vacuum cleaner of FIG. 1 taken along the lines B-B of FIG. 1, with the release lever in a resting position.
Figure 9B:
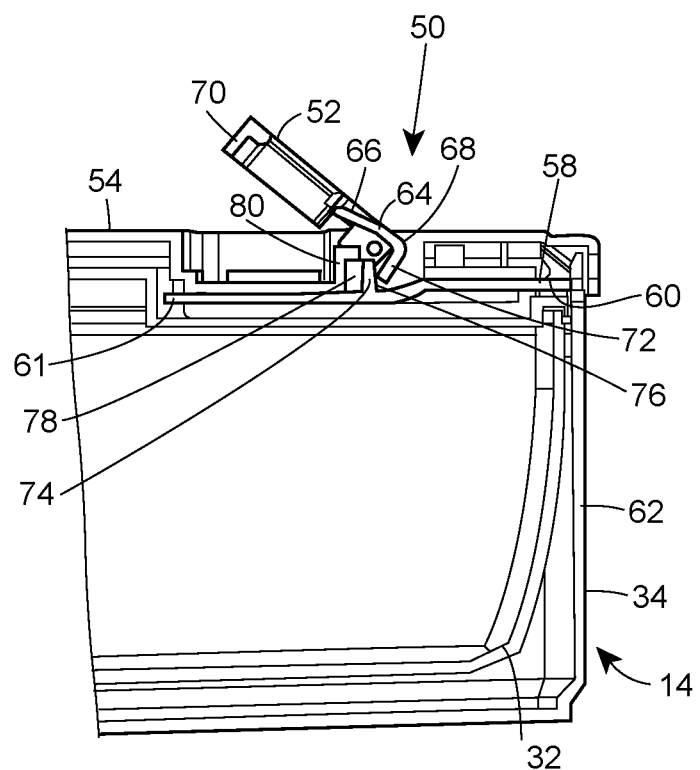
FIG. 9B is a sectional view of a portion of the vacuum cleaner of FIG. 7 taken along the lines C-C of FIG. 7, with the release lever in an upward position.

Referring now to FIGS. 9A and 9B, the release lever 52 further includes a base 64 having a first end 66 and a second end 68. The release lever 52 also includes a handle 70 attached to the first end 66 of the base 64 and a flange 72 downwardly extending from the second end 68 of the base 64. In addition to the release lever 52, the locking mechanism 50 further includes a locking bar 58 that is in contact with a portion the release lever 52. The locking bar 58 includes a first end portion 60 and a second end portion 61 disposed opposite the first end portion 60. The first end portion 60 is adapted to engage a liner 62 of the collector module 14 when the release lever 52 is in a resting position, as depicted, for example, in FIG. 9A. The liner 62 is depicted as encompassing the collector module 14 on all but one side, but the liner can encompass less of the collector module and still perform adequately in accordance with the claimed invention. The second end portion 61 is disposed below the handle 70. An inwardly extending arm 74 is in contact with the flange 72 of the release lever 52. Upon pulling the release lever 52 toward the release position, the flange 72 of the release lever 52 moves in a downward direction along the length of the arm 74 of the locking bar 58 and pivots (FIG. 9B) to push a surface 76 of the arm 74 and move the first end portion 60 of the locking bar 58 out of the liner 62.

More generally, upon pulling the release lever 54 towards the release position, as depicted in FIGS. 7 and 9B, the release lever 52 moves the first end portion 60 of the locking bar 58 out of the liner 62 to unlock the collector module 14. Said another way, upon pulling the release lever 52 towards the release position, the first end portion 60 of the locking bar 58 is moved out of the liner 62 to unlock collector module 14 and allow it to be further pulled towards the release position, such as in an upward direction, to disengage and lift the collector module 14 from the vacuum module 12 when desired.

As further depicted in FIGS. 9A and 9B, the release lever 52 includes a biasing mechanism 78, such as a spring, disposed between the arm 74 of the locking bar 58 and a recessed surface 80 of the accessible portion 54 of the collector module 14. The biasing mechanism 78 is in an expanded position when the release lever 52 is in a resting position, as depicted in FIG. 9A. In this orientation, the biasing mechanism 78 biases the release lever 52 in the resting position. The biasing mechanism 78 is in a compressed position when the release lever 52 is in the release position, as depicted in FIG. 9B. As one of ordinary skill in the art will understand, the biasing mechanism 78 may be any type of spring, such as a torsion spring or a leaf spring, a pressurized gas mechanism, an electric motor, an elastic membrane, and/or any other suitable mechanism capable of biasing the release lever 52 and still fall within the scope of the present disclosure.

Figure 10:
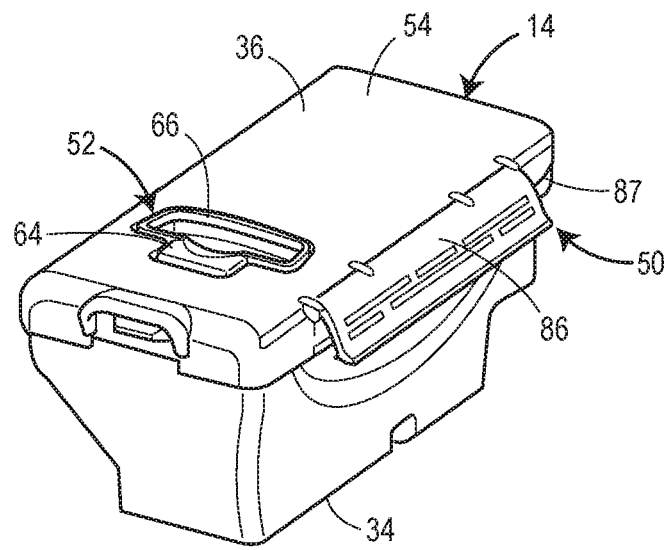
FIG. 10 is a perspective view of the collector module of the vacuum cleaner of FIG. 1.
Figure 11:
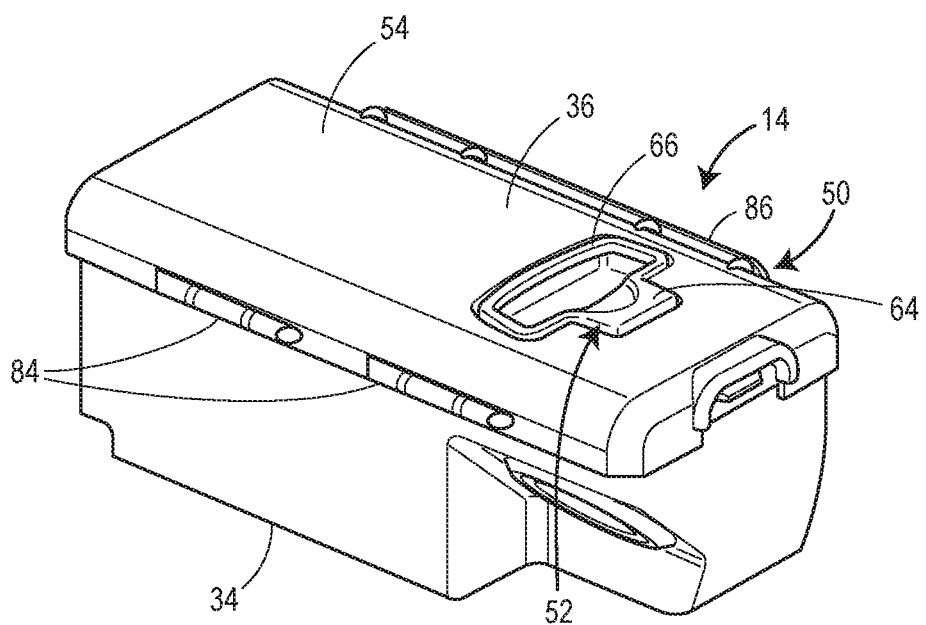
FIG. 11 is another perspective view of the collector module of the vacuum cleaner of FIG. 1.

Referring now to FIGS. 10 and 11, the collector module 14 of the vacuum 10 further includes a lid 36 that is permanently attached to the collector housing 34 via at least one hinge 84 (FIG. 11). More specifically, and in one example, a pair of hinges 84 attach the lid 36 to the collector housing 34, as depicted in FIG. 11. One of ordinary skill in the art will appreciate that more than one hinge or a plurality of hinges, such as three or more, may additionally or alternatively be used and still fall within the scope of the present disclosure. In addition, one of ordinary skill in the art will further understand that the hinge 84 may be any hinge that functions to keep the lid 36 attached to the collector housing 34 and enable the lid 36 to rotate about an axis A (FIG. 11) of the hinges 84 from a closed position (FIGS. 10 and 11) to an open position (not depicted).

Still further, and in another example, a latch 86 may be disposed on a front portion 87 (FIG. 10) of the collector housing 34 or, more generally, the collector module 14. The latch 86 is moveable between a snapped position, as depicted in FIG. 10, for example, and an unsnapped position. When the latch 86 is moved to the unsnapped position, the lid 36 is moveable about the hinge or hinges 84 to an open position (not depicted). Because the lid 36 is secured permanently to the collector housing 34, concerns about the lid 36 being lost or misplaced are eliminated.

Referring now to FIGS. 12-16, another vacuum cleaner 100 to be mounted inside a vehicle having the locking mechanism 50 of the present disclosure is depicted. Unlike the vacuum cleaner 10 of FIGS. 1-8, the vacuum cleaner 100 is in an in-line configuration. Aside from the different assembly arrangement, the vacuum cleaner 100 is otherwise essentially identical to the vacuum cleaner 10 depicted in FIGS. 1-9B, including the same locking mechanism 50 and associated parts described above. As a result, parts of the vacuum cleaner 100 identical to parts of the vacuum cleaner 10 are numbered 100 more than the vacuum cleaner 10. Like the vacuum cleaner 10, the vacuum cleaner 100 is also configured to be installed within a passenger compartment of the vehicle to provide easy access and use of the vacuum cleaner 100 for cleaning the interior of the passenger compartment. For brevity, many of the shared features are not described again herein, but the reader is referred to the detailed descriptions thereof provided above.

Figure 15:
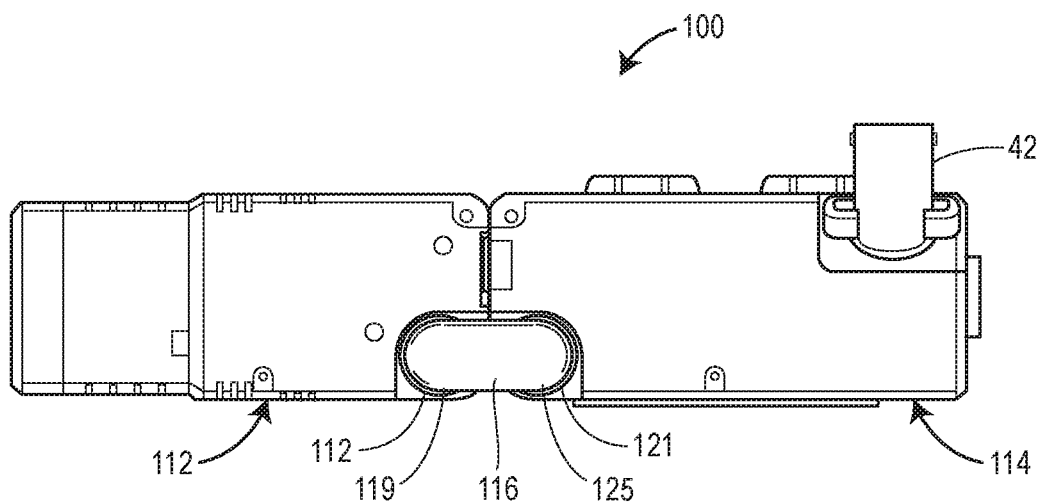
FIG. 15 is a bottom view of the vacuum cleaner of FIG. 12.
Figure 16:
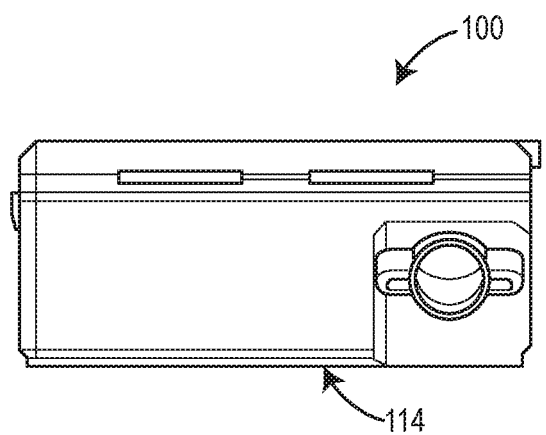
FIG. 16 is a rear view of the vacuum cleaner of FIG. 12)

More specifically, the vacuum cleaner 100 has a modular configuration, including a vacuum module 112 and a collector module 114 that can be connected to each other as an integrated unit in any of a plurality of different pre-defined assembly arrangements with an interconnecting duct 116. The vacuum module 112 includes all the same parts as the vacuum module 12 depicted in FIG. 6. Likewise, the collector module 114 of FIGS. 12-16 also includes all of the same parts of the collector module 14 of FIG. 6. The interconnecting duct 116 may not be flexible, but rather may have a fixed pre-defined shape that allows the collector module 114 to be operatively connected to the vacuum module 112 in only a limited number of predefined assembly arrangements. In one example, the interconnecting duct 116 has a substantially rigid body that forms a fluid flow duct 117 extending from a first duct opening 119 to a second duct opening 121 (FIG. 15). In addition, the body of the interconnecting duct 116 is a U-shaped tube extending from the first duct opening 119 at a first end 123 of the tube to the second duct opening 121 at a second end 125 of the tube.

Figure 12:
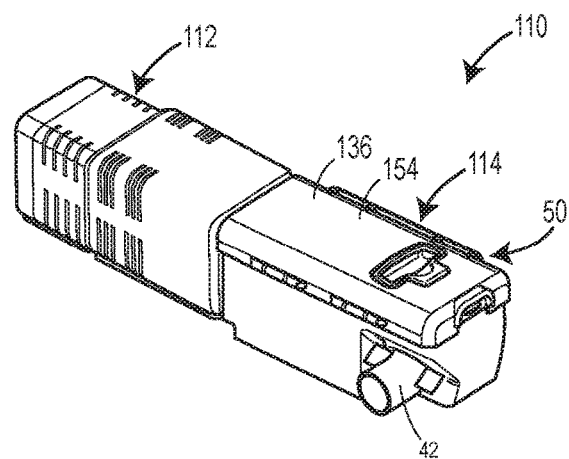
FIG. 12 is an isometric view of a vacuum cleaner to be mounted inside a vehicle having the locking mechanism according to the present disclosure, the vacuum cleaner in a second assembly arrangement and installation orientation.
Figures 13A, 13B, 13C:
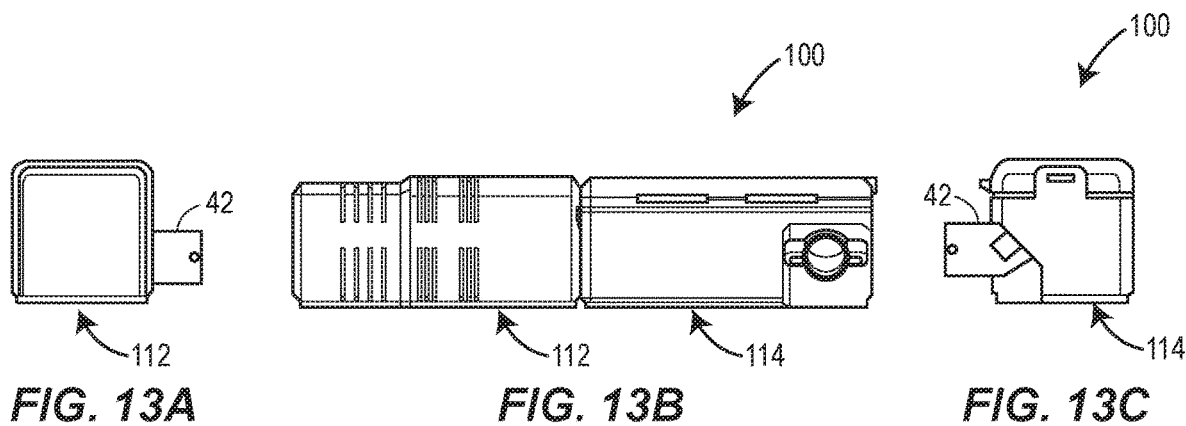
FIG. 13A is a side view of the vacuum cleaner of FIG. 12.
FIG. 13B is a front view of the vacuum cleaner of FIG. 12.
FIG. 13C is another side view of the vacuum cleaner of FIG. 12.
Figure 14:
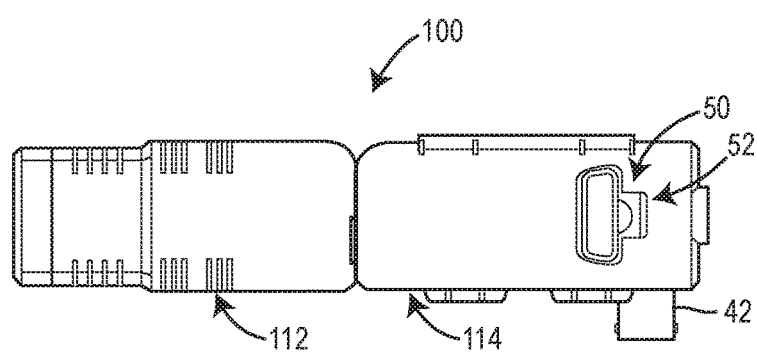
FIG. 14 is a top view of the vacuum cleaner of FIG. 12.

The locking mechanism 50 for the vacuum cleaner 10 described above is the same locking mechanism used for the vacuum cleaner 100 of FIGS. 12-16 and, therefore, includes all the parts depicted in FIGS. 9A and 9B and explained above relative to the vacuum cleaner 10. More specifically, and in one example, the locking mechanism 50 includes a release lever 52 disposed on an accessible portion 54, such as a top portion 154 or the lid 136 of the collector module 114. The release lever 52 is moveable between a resting position, as depicted in FIG. 12, and a release position, as depicted in FIG. 7, for example, and is accessible from the top portion 154 of the collector module 114. Upon pulling the release lever 52 in a first direction, such as an upward direction or towards the release position, the flange 72 of the release lever 52 moves in a downward direction along the length of the arm 74 of the locking bar 58 and pivots to push a surface 76 of the arm 74 and to move a portion 60 of the locking bar 58 out of engagement with the liner 62.

Turning now to FIGS. 17 and 18, the vacuum cleaner 10, 100 is operatively installed in the passenger compartment 202 of an exemplary vehicle 200 with the vacuum cleaner 10, 100 being secured to one or more fixtures inside the passenger compartment 202. In this way, the vacuum cleaner 10, 100 is prevented from moving inside the passenger compartment 202. As depicted, the vehicle 200 moves in a direction of forward motion along a longitudinal axis A1 of the vehicle 200. In one example, the motor/impeller unit 20 is electrically connected to the electrical system of the automobile 200 so as to provide sufficient power to the motor 24 run the vacuum cleaner 10, 100 for cleaning the interior of the passenger compartment 42. While the vehicle 200 depicted in FIG. 17 is a sport-utility vehicle, one of ordinary skill in the art will appreciate that the vehicle 200 may take many other alternative forms, such as a car, a truck, a tractor, or any other type of vehicle with a passenger compartment and an electrical system sufficient to power the vacuum cleaner 10, 100 such as an aircraft or boat, and still fall within the scope of the present disclosure.

Referring now to FIG. 18, and in one example, the vacuum cleaner 10, 100 is secured inside a center console 204 located between a driver's seat 206 and a passenger seat 208 of the vehicle 200. In other arrangements, the vacuum cleaner 10, 100 may be secured inside a center console 204 between two other seats in the passenger compartment 202, such as between two passenger seats in an intermediate row of seats of the vehicle 200. In the arrangement depicted in FIG. 18, the vacuum cleaner 10, 100 is completely surrounded by the center console 204, such that the center console 204 hides the vacuum cleaner 10, 100 from view of passengers inside the passenger compartment 202. The vacuum cleaner 10, 100 may be secured in any manner sufficient to prevent the collector module 14, 114 and the vacuum module 12, 112 from moving around inside the console. For example, the vacuum module 12, 112 may be secured to portions of the center console 204 and/or other portions of the passenger compartment 202 with brackets and/or fasteners.

In one example, the vacuum cleaner 10, 100 is located in the passenger compartment 202 in such manner that the hose connector 42 (FIGS. 2A and 12) points toward the rear of the vehicle 200. In FIG. 18, the collector module 14, 114 is arranged in the side-by-side position immediately adjacent to the vacuum module 12, 112, as described in detail previously. The vacuum module 12, 112 is located forward of the collector module 14, 114 with respect to the vehicle 200. That is, the vacuum module 12, 112 faces the front end of the automobile 200 and the collector module 14, 114 faces the rear end of the automobile 200.

In addition, each of the vacuum modules 12, 112 and the collector module 14, 114 include an axis A2 and A3, respectively. Each of the axes A2 and A3 is disposed transverse, and preferably perpendicular to the longitudinal axis A1, i.e., the axis along the direction of forward motion, of the vehicle 200. Thus, the axis of the impeller assembly 62, for example, which extends along the axes A2 of the vacuum module 12, 112, is disposed transverse to the longitudinal axis A3 of the automobile 200.

In any case, the vacuum cleaner 10, 100 is operatively installed and secured with the accessible portion, such as the top portion 54, 154, of the collector module 14, 114 facing upward. In this way, the locking mechanism 50 of the collector module 14, 114 is directly accessible from the console 204, allowing a user to easily access the release lever 52. Said another way, in this configuration, the handle 70 of release lever 52 can be easily lifted or pulled to help disengage the collector module 14, 114 from the vacuum module 12, 112 and lift the collector module 14, 114 from the vacuum module 12, 112 and the center console 204. Similarly, upon removal of any debris from the collector module 14, 114, the collector module 14, 114 can be easily returned to its operative position in the vacuum cleaner 10, 100 by inserting the collector module 14, 114 down into the interior of the center console 204 through a top opening 210 to reengage the collector module 14, 114 with the vacuum module 12, 112. This arrangement allows the collector module 14, 114 to be easily removed from the vehicle 200 for removing accumulated debris, cleaning, or other purposes, and reinstalled into its operative position.

Figure 19:
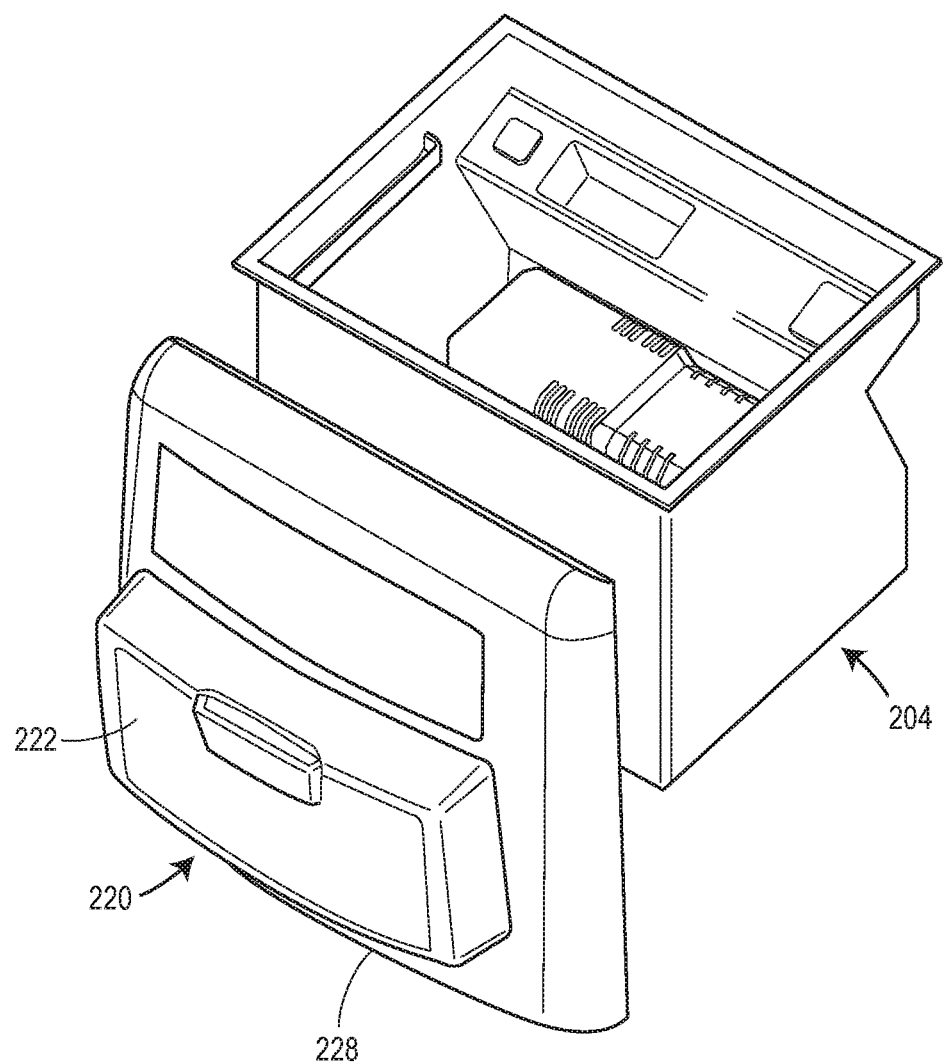
FIG. 19 is a rear perspective view of the console with a hose storage compartment having a compartment door closed.
Figure 20:
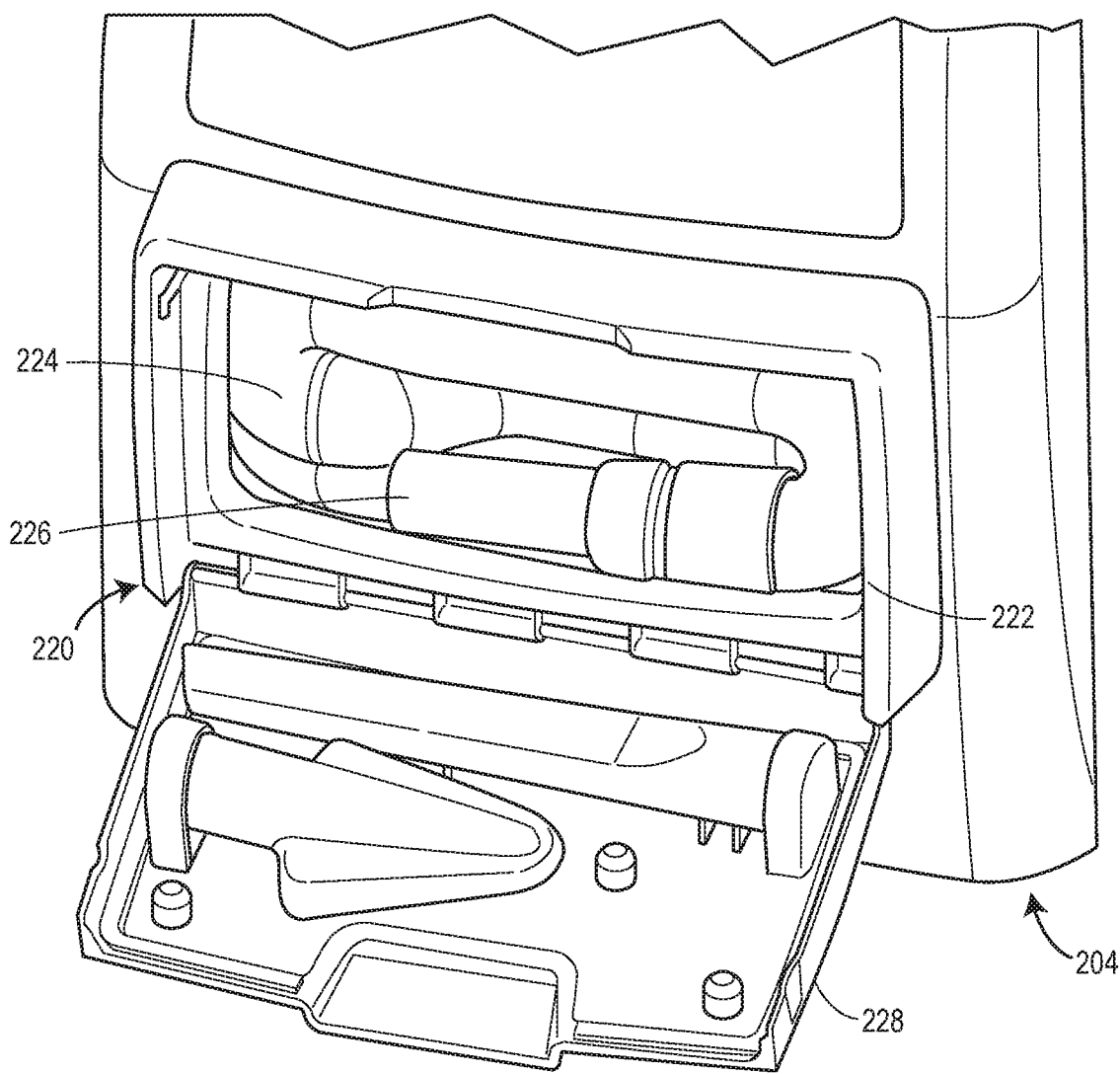
FIG. 20 is another perspective view of a portion of the console of FIG. 19 with the compartment door opened and a vacuum hose stored in the hose storage compartment.
Figure 21:
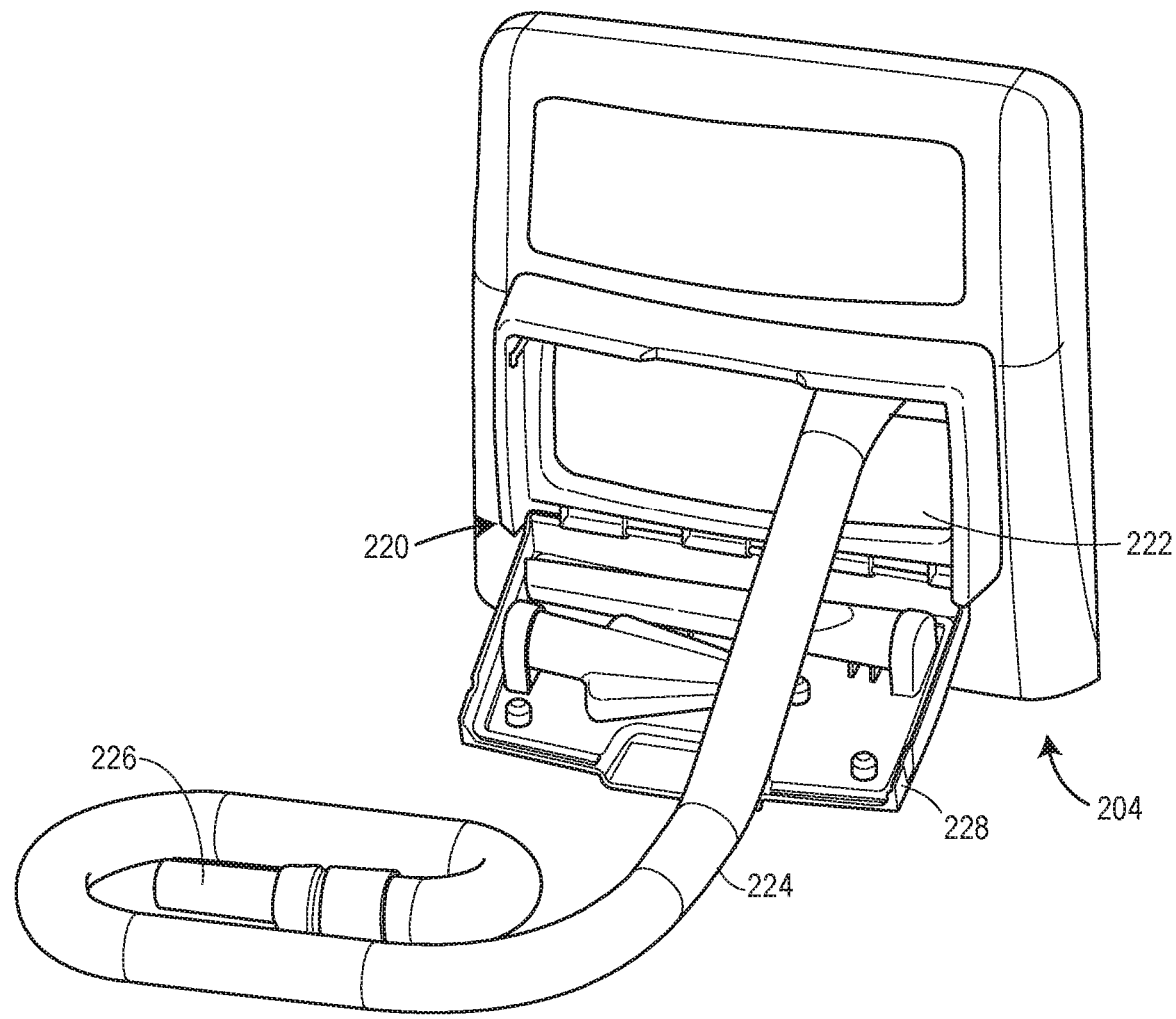
FIG. 21 is another rear perspective view of a portion of the console of FIG. 19 with the compartment door opened and the vacuum hose extending out of the console and the hose storage compartment.

Referring to FIGS. 19-21, a rear side 218 of the center console 204 is visible from a rear view of the console 204, such as from back passenger seats of the vehicle 200 looking forward in the vehicle 200. A storage compartment 220 is located on the rear side of the center console 404. The storage compartment 220 may be an integral part of the center console 204 or it may be a separate compartment placed adjacent to the center console 204. The storage compartment 220 has an opening 222 facing the rear of the vehicle 200. The hose connector 42 (e.g., FIGS. 2A and 5) projects into the storage compartment 220 from the rear side of the vacuum cleaner 10, 100 through a front wall of the compartment 220.

Figure 5:
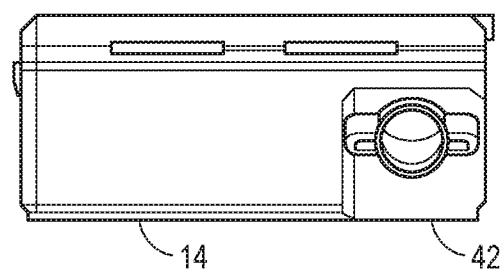
FIG. 5 is a rear view of the vacuum cleaner of FIG. 1.

As depicted in FIG. 20, a vacuum hose 224 is removably stored inside the storage compartment 220. One end of the vacuum hose 224 is operatively connected to the hose connector 42 (FIGS. 2A and 5). Optionally, a nozzle or other vacuum attachment 226 may be attached to the other end of the vacuum hose 224. The vacuum hose 224 can be coiled up and stored inside of the storage compartment 220.

Referring now to FIG. 21, when it is desired to use the vacuum cleaner 10, 100, a user can pull the vacuum hose 224 out of the vacuum compartment 220 in the usual manner. By locating the vacuum cleaner 10, 100 and the vacuum hose 224 in a central area of the passenger compartment 202, it may be possible to reach all of the areas of the interior of the passenger compartment 202 with the vacuum hose 224. Further, with the storage compartment 220 and the opening 222 facing the rear of the vehicle 200 and located forward of the rear passenger seats, it may be easier for a passenger in the rear passenger seats to operate the vacuum cleaner 10, 100 and the vacuum hose 224. This may provide for easier and/or safer vacuuming of the passenger compartment 202 by passenger.

As depicted in FIG. 19, a door panel 228 removably covers the opening 222 into the storage compartment 220. The door panel 228 can be removably secured and locked to the storage compartment 220 in the closed position shown, for example with latches, snap fit brackets, and the like. Similarly, and as depicted in FIG. 20, the door panel 228 can be unlocked and removed from the storage compartment 220 to provide access into the interior of the storage compartment. In this way, when it is desired to use the vacuum cleaner 10, 100, a user can easily remove the door panel 228 from the opening 222 to access the vacuum hose 224. When the user is done using the vacuum cleaner 10, 100, the vacuum hose 224 can be coiled up and stored inside the storage compartment 220, and the door panel 228 can be re-attached to the storage compartment to again close the opening 222.

Referring now to FIGS. 22-27, the vacuum cleaner 10 of FIGS. 1-9B is depicted with another alternative locking mechanism. Unlike the vacuum cleaner 10 of FIGS. 1-9B, the vacuum cleaner 10 includes a locking mechanism 151 having a different release member. More specifically, instead of the release lever 52, the release member of the vacuum cleaner 10 of FIGS. 22-27 includes a release button 153. Aside from the different locking mechanism 151, which is explained more below, the vacuum cleaner 10 of FIGS. 22-27 is identical to the vacuum cleaner 10 depicted in FIGS. 1-9B, including most of the same associated parts described above except the locking mechanism 151. As a result, parts of the vacuum cleaner 10 of FIGS. 1-9B identical to parts of the vacuum cleaner 10 of FIGS. 22-27 are numbered the same. As stated, the vacuum cleaner 10 is configured to be installed within a passenger compartment of the vehicle to provide easy access and use of the vacuum cleaner 100 for cleaning the interior of the passenger compartment. For brevity, many of the shared features are not described again herein, but the reader is referred to the detailed descriptions thereof provided above.

Figure 22:
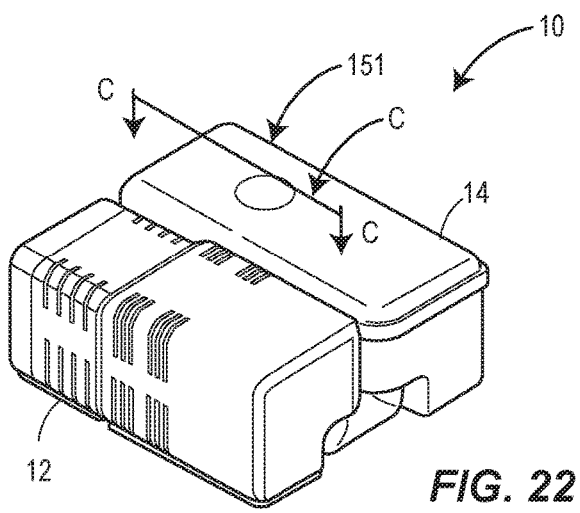
FIG. 22 is an isometric view of the vacuum cleaner of FIG. 1 having another locking mechanism according to another aspect of the present disclosure, the vacuum cleaner in a first assembly arrangement and installation orientation.
Figure 25:
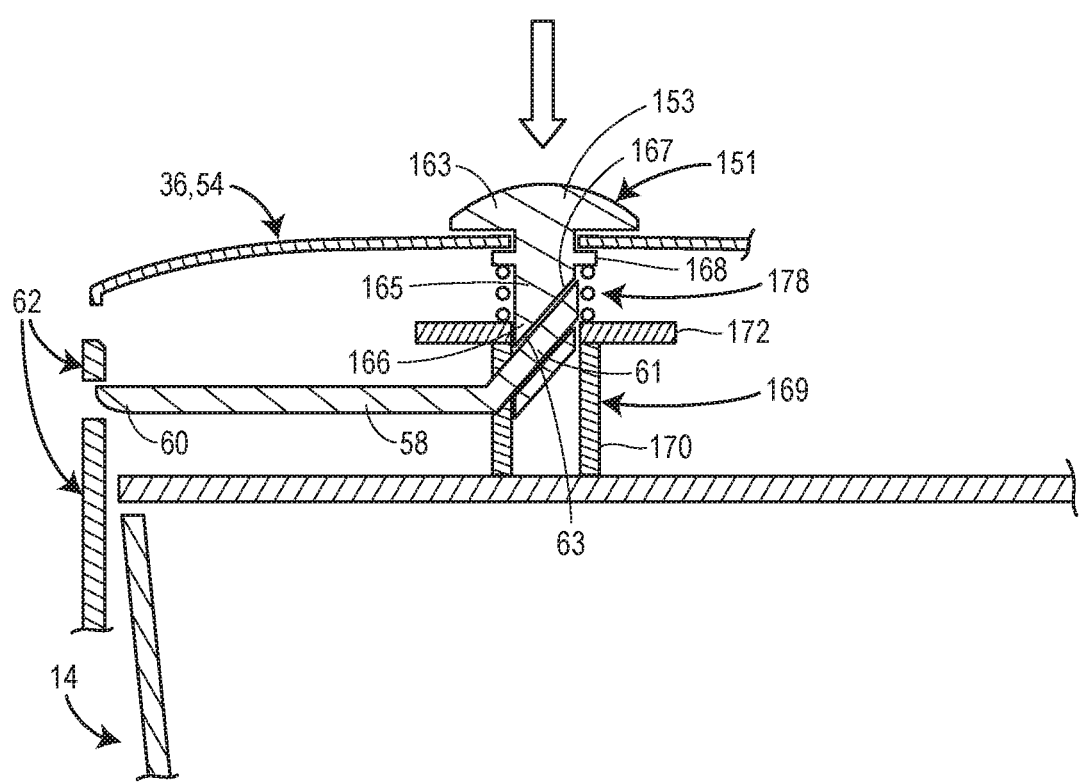
FIG. 25 is a sectional view of a portion of the vacuum cleaner of FIG. 22 taken along the lines C-C of FIG. 22, with the release button in a resting position.
Figure 26:
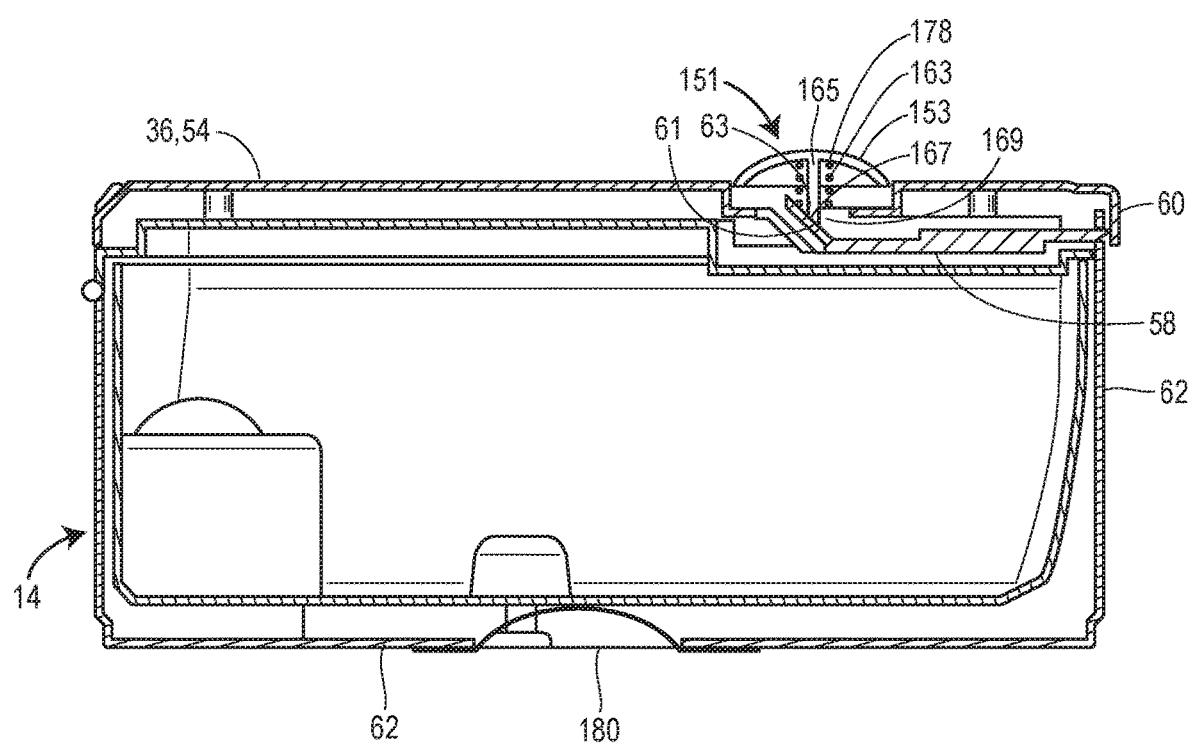
FIG. 26 is a sectional view of a portion of the vacuum cleaner of FIG. 22, with the release member in a resting position.
Figure 27:
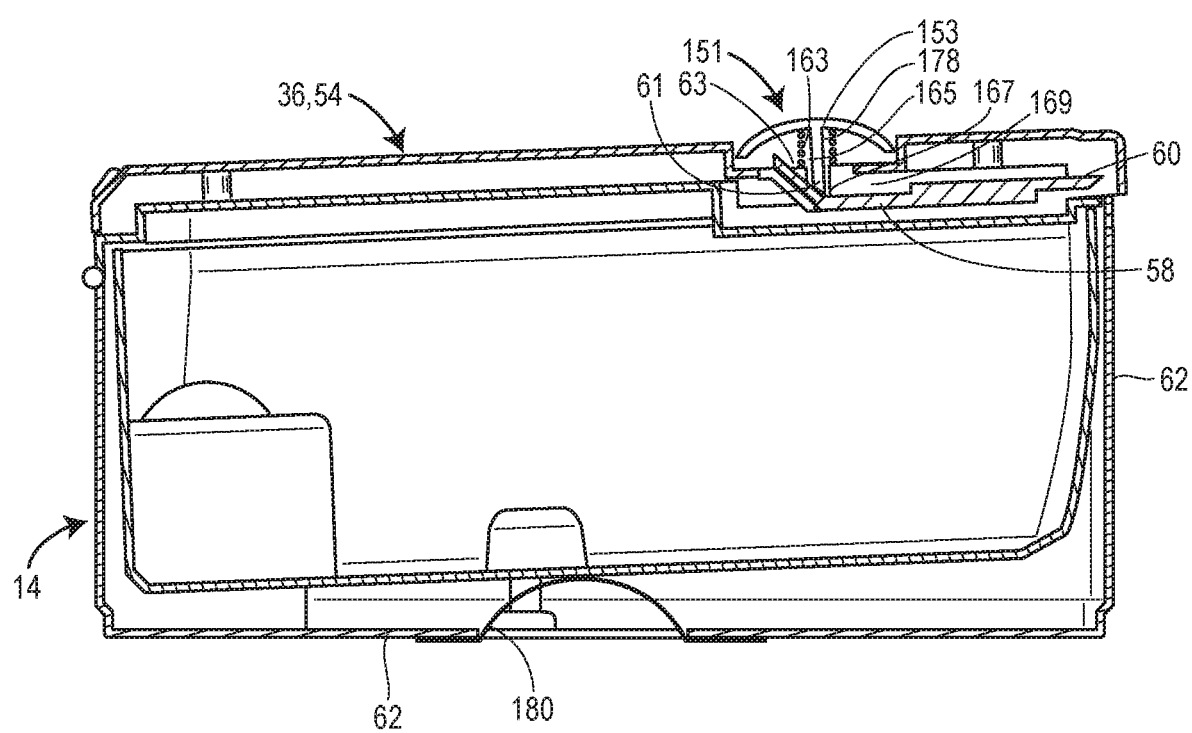
FIG. 27 is a sectional view of a portion of the vacuum cleaner of FIG. 22, with the release member in an actuated position.

Referring now to FIG. 22, and like the release lever 52, the release button 153 of the locking mechanism 151 is disposed on the accessible portion 54, such as the top portion 54 or the lid 36, of the collector module 14. The release button 153 is moveable between a resting position, as depicted in FIGS. 25 and 26, and a release position, as depicted in FIG. 27. In this example, the release button 153 of the locking mechanism 151 is spaced from the center C of the top portion 54. However, the release button 153 may alternatively be disposed closer to the center C or at the center C of the top portion 54 and still fall within the scope of the present disclosure.

Generally, in response to moving the release button 153 from the resting position of FIGS. 25 and 26 towards the release position of FIG. 27, the collector module 14 becomes disengaged from the vacuum module 12. More specifically, upon movement of the release button 153 in a first direction, such as a downward direction or towards the release position, the collector module 14 becomes disengaged from the vacuum module 12 and may then be lifted in a second direction, such as the upward direction, away from the vacuum module 12. This operation of the release button 153 is similar to the operation of the release lever 52 in that actuation of, e.g., pressing, the release button 153 allows the collector module 14 to be disengaged and lifted from the vacuum module 12.

Figures 23A, 23B, 23C:
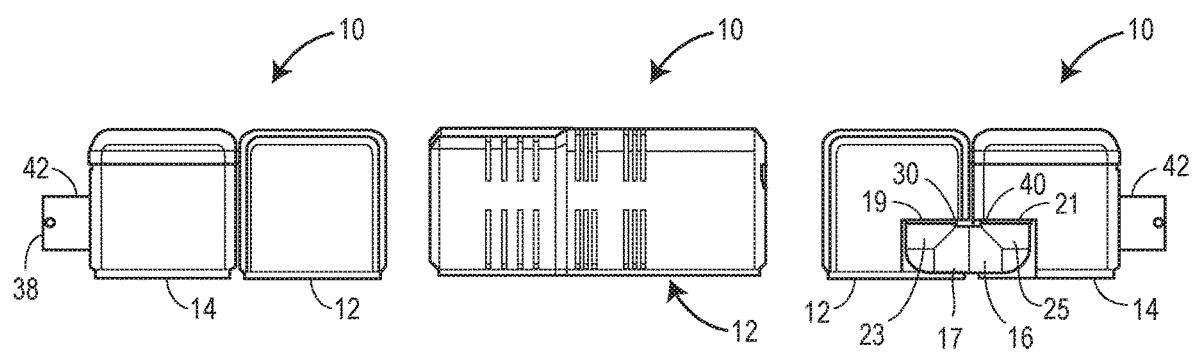
FIG. 23A is side view of the vacuum cleaner of FIG. 22.
FIG. 23B is a front view of the vacuum cleaner of FIG. 22.
FIG. 23C is another side view of the vacuum cleaner of FIG. 22.
Figure 24:
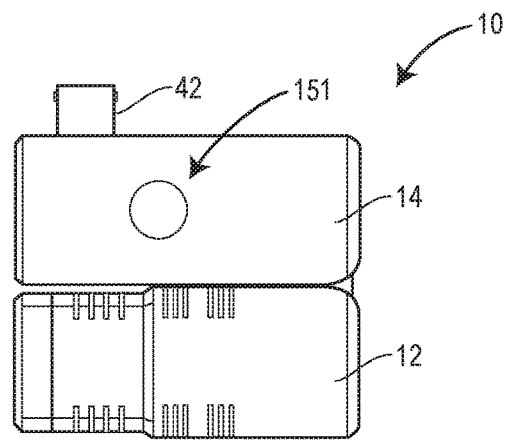
FIG. 24 is a top view of the vacuum cleaner of FIG. 22.

Referring now to FIG. 25, the release button 153 further includes a body 163 having a stem 165 extending therefrom. The stem 165 includes an end 166 with an angled surface 167 and a pair of shoulders 168 that may contact an underside of the lid 36 or top surface 54 of the collector module 14. The body 163 is accessible from an accessible portion of the collector module 14, such as the top portion 54 of the collector module 14, as depicted in FIGS. 22-24, for example. The stem 165 with the angled surface 167 is disposed within a receiving member 169 of the collector module 14. The receiving member 169 includes a cylindrical bore 170 and an outwardly extending flange 172 disposed at one end of the bore 170. The body 163 may be circular or semi-circular in shape, as depicted in FIGS. 22-25, or may alternatively be various other shapes and still fall within the scope of the present disclosure. Likewise, although the stem 165 is depicted as cylindrical in shape, one of ordinary skill in the art will again appreciate that the stem 165 may take the form of various other shapes and still fall within the scope of the present disclosure. Still further, while bore 170 of the receiving member 169 is depicted as cylindrical in shape, one of ordinary skill in the art will again understand that the receiving member 169 and the bore 170 may alternatively take the form of various other shapes and still fall within the scope of the present disclosure.

As further depicted in FIG. 25, the release button 153 includes a biasing mechanism 178, such as a spring, disposed around the stem 165. In one example, the biasing mechanism 178 is disposed between the shoulders 168 of the stem 165 and the flange 172 of the receiving member 169. The biasing mechanism 178 is in an expanded position when the release button 153 is in a resting position, as depicted in FIG. 25. In this orientation, the biasing mechanism 178 biases the release button 153 in the resting position. The biasing mechanism 178 is in a compressed position when the release button 153 is in the release position, as depicted in FIG. 27. As one of ordinary skill in the art will understand, the biasing mechanism 178 may be any type of spring, such as a torsion spring or a leaf spring, a pressurized gas mechanism, an electric motor, an elastic membrane, and/or any other suitable mechanism capable of biasing the release button 153 and still fall within the scope of the present disclosure.

In addition to the release button 153, and like the locking mechanism 50 of FIGS. 1-9B, for example, the locking mechanism 151 further includes the locking bar 58 that is in contact with a portion the release button 153. More specifically, the locking bar 58 includes a first end portion 60 and a second end portion 61 disposed opposite the first end portion 60. The first end portion 60 is adapted to engage a liner 62 of the collector module 14 when the release button 153 is in a resting position, as depicted, for example, in FIGS. 25 and 26. The second end portion 61 includes an angled surface 63 in contact with the angled surface 167 of the stem 165 of the release button 153. In one example, the second end portion 61 of the locking bar 58 is disposed within an opening in the body 170 of the receiving member 169 to enable contact between the angled surface 167 of the stem 165 and the angled surface 63 of the second end portion 61 of the locking bar 58.

Upon actuating, e.g., pushing, the release button 153 toward the release position, the stem 166 moves in a downward direction to push the angled surface 167 of the stem 165 against the angled surface 63 of the second end portion 61 of the locking bar 58. This moves the second end portion 61 of the locking bar 58 in a direction towards the release button 153, such as a slight upward direction. As a result, the first end portion 60 of the locking bar 58 moves towards the receiving member 169 and out of the liner 62, as depicted in FIG. 27. More generally, upon pushing the release button 153 towards the release position, the release button 153 moves the first end portion 60 of the locking bar 58 out of the liner 62 to unlock the collector module 14. Said another way, upon pushing the release button 153 towards the release position, the first end portion 60 of the locking bar 58 is moved out of the liner 62 to unlock or disengage the collector module 14 from the vacuum module 12. Once unlocked, the collector module 14 may be manually grabbed, such as at the sides or edges of the collector module, and further pulled in an upward direction to lift the collector module 14 from the vacuum module 12. Said another way, in this example, the user simultaneously actuates the release button 153 to move the locking bar 58 out of the liner 62 and pulls the collector module 14 from the vacuum module 12.

In another example, and referring now to FIGS. 26 and 27, a leaf spring 180 is disposed on an interior surface, such as a bottom surface, of the liner 62. The leaf spring 180 applies a light, constant force on a bottom portion of the canister 32 when the canister 32 is in the locked position, as depicted in FIG. 26. This force applied by the leaf spring 180 is higher than the force needed to actuate, e.g., depress, the release button 153 and the slide the locking bar 58 out of the liner 62. In this way, the force of the leaf spring 180 pushes the canister 32 upward while the button 153 is still depressed until the portion 60 of the locking bar 58 is removed from the liner 62, as depicted in FIG. 27. The canister 32 may then be grabbed by its sides or edges, for example, and lifted out. To return the canister 32 to its original position within the collector module 14, any area of the canister 32 except the release button 153 may be pushed to lock the canister 32 back into place.

As one of ordinary skill in the art will appreciate, the vacuum cleaners 10, 100 described in the foregoing have several advantages. For example, the unique locking mechanism 50, 151 is disposed on the accessible portion, such as the top portion of the collector module 14, 114, allowing easy access to the same and the ability to directly lift the collector module 14, 114 from the vacuum module 12, 112 upon disengagement from the vacuum module 12,112. In one example, the locking mechanism 50 is both a lifting mechanism and an unlocking mechanism with easy access from the top of the vacuum cleaner 10, 100 when in any position with the vehicle 200, such as the center console or any other area.

As one of ordinary skill in the art will further appreciate, the particular shapes and sizes of the collector modules 14, 114, the vacuum modules 12, 112, and the interconnecting ducts 16, 116, may be modified to conform to many different space configurations as may be dictated by the shapes and sizes of the components within the vehicle 200 and/or decorative design considerations. Typically, it is anticipated that the vacuum cleaners 10, 100 will be configured for installation within the passenger and/or cargo compartment of a vehicle 200. However, the vacuum cleaners 10, 100 could be configured for installation in other areas of a vehicle 200 as well.

Still further, the vacuum cleaner 10, 100 according to some aspects of the present disclosure provides an assembly that may be easily configured to conform to different spaces within the vehicle 200. The modular nature of the vacuum cleaners 10, 100 according to some aspects of the present disclosure allows a single vacuum cleaner 10, 100 to be assembled in different arrangements for different vehicle configurations, while still allowing easy access to the locking mechanism 50 for disengaging and lifting the collector module 14, 114 from the vacuum module 12, 112, for example. Additional and/or alternative functional benefits of vacuum cleaners 10, 100 according to various aspects of the present disclosure will be apparent to a person of ordinary skill in the art.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein any reference to "one example" or "an example" means that a particular element, feature, structure, or characteristic described in connection with the embodiment is included in at least one embodiment. The appearances of the phrase "in one example" in various places in the specification are not necessarily all referring to the same example.

Some examples may be described using the expression "coupled" and "connected" along with their derivatives. For example, some examples may be described using the term "coupled" to indicate that two or more elements are in direct physical or electrical contact. The term "coupled," however, may also mean that two or more elements are not in direct contact with each other, but yet still cooperate or interact with each other. The examples are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B is true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

While various embodiments have been described herein, it is understood that the appended claims are not intended to be limited thereto, and may include variations that are still within the literal or equivalent scope of the claims.

What is claimed:

1. A vacuum cleaner configured to be mounted in a vehicle, comprising:
    a vacuum module configured to draw a vacuum;
    a collector module configured to collect debris, the collector module having an accessible portion, a collector housing and a liner disposed on an inside surface of the collector housing;
    an interconnecting duct that operatively couples the vacuum module to the collector module, the vacuum module separate from the collector module;
    a release member including one of a release lever or a release button, the release member disposed on the accessible portion of the collector module, the release member moveable between a resting position and a release position; and
    a locking bar in contact with the release member and having a portion adapted to engage the liner of the collector module when the release member is in the resting position,
    wherein, upon actuating the release member towards the release position, the release member moves the locking bar out of engagement with the liner to unlock the collector module and allow the collector module to be further pulled towards the release position to disengage the collector module from the vacuum module, and
    wherein the interconnecting duct is configured to operatively couple the collector module to the vacuum module in any one of a plurality of pre-defined arrangements, the plurality of pre-defined arrangements including at least one of an in-line configuration and a side-by-side configuration.

2. The vacuum cleaner of claim 1, wherein the release member comprises a release lever including a base having a first end and a second end, a handle attached to the first end of the base, and a flange downwardly extending from the second end of the base.

3. The vacuum cleaner of claim 2, wherein the locking bar includes an inwardly extending arm in contact with the downwardly extending flange of the release lever.

4. The vacuum cleaner of claim 3, wherein upon actuating the release lever towards the release position, a portion of the locking bar is moved out of the liner and the collector module is disengaged and lifted from the vacuum module.

5. The vacuum cleaner of claim 1, further comprising a biasing spring for biasing the release member in the resting position, the biasing spring in an expanded position when the release member is in the resting position and in a compressed position when the release member is in the release position.

6. The vacuum cleaner of claim 1, wherein the interconnecting duct has a body that forms a fluid flow duct extending from a first duct opening to a second duct opening, the body comprising a tube extending from the first duct opening at a first end of the tube to the second duct opening at a second end of the tube.

7. The vacuum cleaner of claim 1, wherein the release member comprises a release button having a body and a stem extending from the body, the stem having an angled surface, and wherein the locking bar has an angled surface in contact with the angled surface of the stem, such that upon actuating the release button, the stem moves to push the angled surface of the locking bar and move a portion of the locking bar out of the liner.

8. The vacuum cleaner of claim 1, wherein the collector module includes the collector housing, a debris canister removably disposed in the collector housing, wherein the debris canister can be slidably removed from and reinserted into the collector housing, a lid permanently attached to the collector housing via a hinge, and a latch disposed on a side of the collector housing, the latch moveable between a snapped position and an unsnapped position, such that when the latch is moved to the unsnapped position, the lid is moveable about the hinge to an open position.

9. The vacuum cleaner of claim 8, wherein the collector housing includes a hose connector projecting outwardly from a rear portion of the collector housing and coupled to an air inlet, wherein the hose connector is configured to be coupled to a vacuum hose.

10. The vacuum cleaner of claim 1, wherein the vacuum module and the collector module are configured to fit one of into a space between two seats of the vehicle when operatively coupled together or within a console housing.

11. The vacuum cleaner of claim 7, wherein the collector module includes a leaf spring disposed on an interior surface of the liner, the leaf spring applying a force to a canister of the collector module, such that the canister is pushed upward when the release button is depressed.

* * * * *